(12) United States Patent
Alzate Perez et al.

(10) Patent No.: US 10,817,568 B2
(45) Date of Patent: Oct. 27, 2020

(54) DOMAIN-ORIENTED PREDICTIVE MODEL FEATURE RECOMMENDATION SYSTEM

(71) Applicant: INTERNATIONAL BUSINESS MACHINES CORPORATION, Armonk, NY (US)

(72) Inventors: Carlos Alzate Perez, Ongar (IE); Bei Chen, Dublin (IE); Ulrike Fischer, Dunboyne (IE); Yassine Lassoued, Carpenterstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/613,404

(22) Filed: Jun. 5, 2017

(65) Prior Publication Data

US 2018/0349514 A1 Dec. 6, 2018

(51) Int. Cl.
G06F 17/27 (2006.01)
G06F 16/9032 (2019.01)
G06N 20/00 (2019.01)
G06F 16/21 (2019.01)
G06F 16/9535 (2019.01)
G06F 16/2452 (2019.01)

(52) U.S. Cl.
CPC ...... G06F 16/90332 (2019.01); G06F 16/212 (2019.01); G06F 16/24522 (2019.01); G06F 16/9535 (2019.01); G06N 20/00 (2019.01)

(58) Field of Classification Search
CPC ...................................................... G06F 17/02

USPC .......................................... 704/1, 9, 10, 257
See application file for complete search history.

(56) References Cited

U.S. PATENT DOCUMENTS

| | | | |
|---|---|---|---|
| 7,739,102 B2 * | 6/2010 | Bender | G06F 17/2785 704/2 |
| 7,801,836 B2 | 9/2010 | Sureka | |
| 9,269,051 B2 | 2/2016 | Guo et al. | |
| 2005/0240393 A1 * | 10/2005 | Glosson | G06F 17/24 704/8 |
| 2005/0289141 A1 * | 12/2005 | Baluja | G06F 17/2735 |
| 2006/0247915 A1 * | 11/2006 | Bradford | G06F 3/0481 704/1 |
| 2007/0076862 A1 * | 4/2007 | Chatterjee | G06F 17/276 379/433.06 |
| 2008/0091633 A1 * | 4/2008 | Rappaport | G06N 5/022 706/50 |
| 2011/0320548 A1 * | 12/2011 | Jonsson | G06F 3/0237 709/206 |
| 2015/0170048 A1 | 6/2015 | Lin et al. | |
| 2015/0261850 A1 | 9/2015 | Mittal | |
| 2015/0339577 A1 | 11/2015 | Waltinger | |
| 2016/0232457 A1 | 8/2016 | Gray et al. | |
| 2017/0076223 A1 | 3/2017 | Kozhaya et al. | |
| 2018/0268318 A1 * | 9/2018 | Matam | G06N 7/005 |

* cited by examiner

Primary Examiner — Jesse S Pullias
(74) Attorney, Agent, or Firm — Griffiths & Seaton PLLC

(57) ABSTRACT

Embodiments for recommending predictive modeling methods and features by a processor. One or more extracted methods and features of one or more predictive models are received according to selected criteria from both a structured database and from one or more data sources from a remote database. One or more extracted predictive model methods and features may be recommended according to the selected criteria.

21 Claims, 15 Drawing Sheets

| EXTRACTED FEATURE | CONTEXT | | CORRECT ? |
|---|---|---|---|
| CALENDAR VARIABLES | SPECIFICALLY, THE INPUTS FOR THESE MODELS ARE CALENDAR VARIABLES, LAGGED ACTUAL DEMAND OBSERVATIONS, AND HISTORICAL AND FORECAST TEMPERATURE TRACES FOR ONE OR MORE SITES IN THE TARGET POWER SYSTEM | ✓ | YES |
| LAGGED ACTUAL DEMAND OBSERVATIONS | | ✓ | YES |
| HISTORICAL AND FORECAST TEMPERATURE TRACES | | ✓ | YES |
| PREVIOUS DEMAND OBSERVATIONS | PREVIOUS DEMAND OBSERVATIONS ARE USED AS PREDICTORS; | ✓ | YES |
| ... | ... | ... | ... |
| TIME SERIES | INDEX TERMS—ADDITIVE MODEL, FORECAST DISTRIBUTION, SHORT-TERM LOAD FORECASTING, TIME SERIES. | ✗ | NO |
| ERRORS | ERRORS ARE SERIALLY CORRELATED | ✗ | NO |
| ... | ... | ... | ... |

USER CORRECTS INFORMATION EXTRACTED BY SYSTEM
CORRECTED INFORMATION IS THEN FED BACK INTO THE SYSTEM'S DATABASE

~1100

INPUT : DOMAIN, OBJECTIVE, DATA DESCRIPTION
- DOMAIN AND OBJECTIVE MAY BE SELECTED FROM A PREDEFINED LIST (SELECTION LIST)

| DOMAIN | SUB - DOMAIN | OBJECTIVE | TIME FREQUENCY |
|---|---|---|---|
| ENERGY | ELECTRICITY LOAD | 1-DAY AHEAD FORECASTING | 1 HOUR |
| TRANPORT | TAXI DESTINATION | NEXT EVENT FORECAST | 1 MINUTE |

FIG. 6

- INPUT
  - DOMAIN/SUBDOMAIN: ENERGY/SMART METER
  - OBJECTIVE: CLUSTERING BASED ON USER BEHAVIOR
  - DATA DESCRIPTION: 1-MINUTE SMART METER DATA WITH GEOLOCATIONS, INCLUDING METER READINGS (KW/H), LAT/LON, TIMESTAMPS
- OUTPUT
  - RECOMMENDED METHODS

| METHOD | RELEVANCE | SOURCE | HITS |
    |---|---|---|---|
    | K-MEANS | ☆☆ | JOHN DOE 1 ET AL (2005), IEEE TPWS | 96 |
    | SPECTRAL CLUSTERING | ☆☆ | JOHN DOE 2 ET AL (2012), ICDM | 24 |
    | HIERARCHICAL CLUSTERING | ☆ | JOHN DOE 3 ET AL (2010), REVSTAT | 22 |

- RECOMMENDED FEATURES
    * WAVELET DECOMPOSITIONS, (PERIODIC) AUTOREGRESSIVE TERMS, DAY TYPE, TIME OF YEAR, TYPICAL DAILY PROFILES AND STATISTICS (E.G., MAX, MIN, STD)

FIG. 7A

- INPUT
  - DOMAIN/SUBDOMAIN: TRANSPORTATION/CITY BIKES
  - OBJECTIVE: SHORT-TERM FORECASTING OF BIKE AVAILABILITY
  - DATA DESCRIPTION: NUMBER OF AVAILABLE BIKES AT EACH BIKE STATION EVERY 5 MINS, LATITUDE/LONGITUDE, TIMESTAMP
- OUTPUT
  - RECOMMENDED METHODS

| METHOD | RELEVANCE | SOURCE | HITS |
  |---|---|---|---|
  | BAYESIAN NETWORKS | ★★★ | JOHN DOE 1 ET AL (2009), IJCAI | 265 |
  | GAM | ★★ | JOHN DOE 2 ET AL (2013), ITSC | 256 |
  | ARMA | ★ | JOHN DOE 3 ET AL (2010), PMC | 150 |

- RECOMMENDED FEATURES
    - DAY TYPE, TIME OF DAY, TIME OF YEAR, BIKE AVAILABILITY AT THE ADJACENT STATIONS, AUTOREGRESSIVE TERMS, WEATHER

FIG. 7B

SHORT-TERM LOAD FORECASTING BASED ON A SEMI-PARAMETRIC ADDITIVE MODE

JOHN DOE, SENIOR MEMBER, IP GROUP

| | |
|---|---|
| SEMI-PARAMETRIC ADDITIVE MODELS | 0.8 |
| ADDITIVE MODELS | 0.6 |
| REGRESSION | 0.5 |
| MODIFIED BOOTSTRAP METHOD | 0.5 |
| BOOTSTRAP METHOD | 0.4 |

IN THIS PAPER, SEMI-PARAMETRIC ADDITIVE MODELS ARE PROPOSED TO ESTIM VARIABLES. SPECIFICALLY, THE INPUTS FOR THESE MODELS ARE CALENDAR VARIA HISTORICAL AND FORECAST TEMPERATURE TRACES FOR ONE OR MORE SITES IN THE TARGE IN ADDITION TO POINT FORECASTS, PREDICTION INTERVALS ARE ALSO ESTIMATED USING A MODIFIED BOOTSTRAP METHOD SUITABLE FOR THE COMPLEX SEASONALITY SEEN IN ELECTRICITY DEMAND DATA. THE PROPOSED METHODOLOGY HAS BEEN USED TO FORECAST THE HALF-HOURLY ELECTRICITY DEMAND FOR UP TO SEVEN DAYS AHEAD FOR POWER SYSTEMS IN THE COUNTRY A NATIONAL ELECTRICITY

MARK

INDEX TERMS—ADDITIVE MODEL, FORECAST DISTRIBUTION, SHORT-TERM LOAD FORECASTING, TIME SERIES.

I. INTRODUCTION

THE PURPOSE OF THIS STUDY IS TO DEVELOP SHORT-TERM LOAD FORECASTING (STLF) MODELS FOR REGIONS IN THE NATIONAL ELECTRICITY MARKET (NEM) OF COUNTY A. THIS PAPER FOLLOWS A REGRESSION METHODOLOGY, BUT FOCUSES ON THE NONLINEAR RELATIONSHIPS BETWEEN LOAD AND VARIOUS DRIVING VARIABLES. THIS STUDY AIMS TO ALLOW NONLINEAR AND NONPARAMETRIC TERMS WITHIN THE REGRESSION FRAMEWORK. IN PARTICULAR, SEMIPARAMETRIC ADDITIVE MODELS ARE PROPOSED TO ESTIMATE THE RELATIONSHIPS BETWEEN LOAD AND THE EXOGENOUS VARIABLES, INCLUDING CALENDAR VARIABLES, LAGGED LOAD OBSERVATIONS, AND HISTORICAL AND FORECAST TEMPERATURE TRACES FOR ONE OR MORE SITES IN THE TARGET POWER SYSTEMS. IN ADDITION TO POINT FORECASTS, FORECASTING DISTRIBUTIONS ARE ALSO ESTIMATED BASED ON A BOOTSTRAP METHOD.
THE PROPOSED METHODOLOGY HAS BEEN USED TO FORECAST THE HALF-HOURLY ELECTRICITY DEMAND FOR UP TO SEVEN DAYS AHEAD FOR POWER SYSTEMS IN THE NEM. THE PERFORMANCE OF THE METHODOLOGY IS VALIDATED VIA OUT-OF-SAMPLE COMPARISONS USING REAL DATA FROM THE POWER SYSTEMS. THE PROPOSED FORECASTING SOFTWARE HAS BEEN…

I. METHODOLOGY

THE PROPOSED SEMI-PARAMETRIC ADDITIVE MODEL IS IN THE REGRESSION FRAMEWORK BUT WITH SOME NONLINEAR RELATIONSHIPS AND WITH SERIALLY CORRELATED ERRORS. IN PARTICULAR, THE PROPOSED MODELS ALLOW NONLINEAR AND NONPARAMETRIC TERMS USING THE FRAMEWORK OF ADDITIVE MODELS [19]…

FIG. 9

SHORT-TERM LOAD FORECASTING BASED ON A SEMI-ADDITIVE MODE

JOHN DOE, SENIOR MEMBER, IP GROUP

| | |
|---|---|
| CALENDAR VARIABLES | 0.65 |
| LAGGED ACTUAL DEMAND OBSERVATIONS | 0.65 |
| HISTORICAL AND FORECAST TEMPERATURE | 0.65 |
| PREVIOUS DEMAND OBSERVATIONS | 0.57 |
| TEMPERATURE FROM TWO SITES | 0.4 |

IN THIS PAPER, SEMI-PARAMETRIC ADDITIVE MODELS ARE PROPOSED TO ESTIMATE THE RELATIONSHIPS BETWEEN DEMAND AND THE DRIVER VARIABLES. SPECIFICALLY, THE INPUTS FOR THESE MODELS ARE CALENDAR VARIABLES, LAGGED ACTUAL DEMAND OBSERVATIONS, AND HISTORICAL AND FORECAST TEMPERATURE TRACES FOR ONE OR MORE SITES IN THE TARGET POWER SYSTEM. IN ADDITION TO POINT FORECASTS, PREDICTION INTERVALS ARE ALSO ESTIMATED USING A MODIFIED BOOTSTRAP METHOD SUITABLE FOR THE COMPLEX SEASONALITY SEEN IN ELECTRICITY DEMAND DATA. THE PROPOSED METHODOLOGY HAS BEEN USED TO FORECAST THE HALF-HOURLY ELECTRICITY DEMAND FOR UP TO SEVEN DAYS AHEAD FOR POWER SYSTEMS IN THE COUNTRY "A" NATIONAL ELECTRICITY MARKET...

INDEX TERMS—ADDITIVE MODEL, FORECAST DISTRIBUTION, SHORT-TERM LOAD FORECASTING, *TIME SERIES*.

I. INTRODUCTION

THIS STUDY AIMS TO ALLOW NONLINEAR AND NONPARAMETRIC TERMS WITHIN THE REGRESSION FRAMEWORK. IN PARTICULAR, SEMI-PARAMETRIC ADDITIVE MODELS ARE PROPOSED TO ESTIMATE THE RELATIONSHIPS BETWEEN LOAD AND THE EXOGENOUS VARIABLES, INCLUDING CALENDAR VARIABLES, LAGGED LOAD OBSERVATIONS, AND HISTORICAL AND FORECAST TEMPERATURE TRACES FOR ONE OR MORE SITES IN THE TARGET POWER SYSTEMS. IN ADDITION TO POINT FORECASTS, FORECASTING DISTRIBUTIONS ARE ALSO ESTIMATED BASED ON A BOOTSTRAP METHOD.

II. METHODOLOGY

SPECIFIC FEATURES OF THE MODELS ARE SUMMARIZED BELOW:
- PREVIOUS DEMAND OBSERVATIONS ARE USED AS PREDICTORS;
- TEMPERATURES FROM TWO SITES ARE CONSIDERED;
- TEMPERATURE EFFECTS ARE MODELED USING REGRESSION SPLINES;
- TEMPERATURES FROM THE LAST THREE HOURS AND THE SAME PERIOD FROM THE LAST SIX DAYS ARE CONSIDERED;
- LOADS FROM THE LAST THREE HOURS AND THE SAME PERIOD FROM THE LAST SIX DAYS ARE CONSIDERED;
- ERRORS ARE SERIALLY CORRELATED.

MODELING AND FORECASTING DAILY ELECTRICITY LOAD CURVES: A HYBRID APPROACH

*JOHN DOE 1, JOHN DOE 2, JOHN DOE 3, AND JOHN DOE 4*

WE PROPOSE A HYBRID APPROACH FOR THE MODELING AND THE SHORT-TERM FORECASTING OF ELECTRICITY LOADS...

WE ILLUSTRATE THE HYBRID METHOD USING FRENCH ELECTRICITY LOADS BETWEEN...

KEYWORDS: CORRELATION DIMENSION; DIMENSION REDUCTION; ELECTRICITY LOADS; GENERALIZED ADDITIVE MODELS; SINGULAR VALUE DECOMPOSITION.

★★★☆☆

SHORT-TERM LOAD FORECASTING BASED ON A SEMI-PARAMETRIC ADDITIVE MODEL

*JOHN DOE, SENIOR MEMBER, IP GROUP, AND JOHN DOE 2*

SHORT-TERM LOAD FORECASTING IS AN ESSENTIAL INSTRUMENT IN POWER SYSTEM PLANNING, OPERATION, AND CONTROL. MANY OPERATING DECISIONS ARE BASED ON LOAD FORECASTS... OVERESTIMATION OF ELECTRICITY DEMAND WILL CAUSE A CONSERVATIVE OPERATION,...

INDEX TERMS — ADDITIVE MODEL, FORECAST DISTRIBUTION, SHORT-TERM LOAD FORECASTING, TIME SERIES.

★★★★★ — USER WHO TESTED THE APPROACH RATES THE METHOD/ARTICLE
USER REVIEWS ARE THEN FED BACK INTO THE SYSTEM'S DATABASE

LOCAL SHORT AND MIDDLE TERM ELECTRICITY LOAD FORECASTING WITH SEMI-PARAMETRIC ADDITIVE MODELS

*JOHN DOE 1, JOHN DOE 2, JOHN DOE 3*

ELECTRICITY LOAD...
GENERALIZED A...
2200 SUBSTATIONS...

INDEX TERMS — ELECTRICITY NETWORKS, GENERALIZED ADDITIVE MODEL, LOAD FORECASTING, SEMI-PARAMETRIC MODEL...

DOMAIN-ORIENTED PREDICTIVE MODEL FEATURE RECOMMENDATION SYSTEM

BACKGROUND OF THE INVENTION

Field of the Invention

The present invention relates in general to computing systems, and more particularly to, various embodiments for recommending predictive modeling methods and features by a processor.

Description of the Related Art

In today's interconnected and complex society, computers and computer-driven equipment are more commonplace. Processing devices, with the advent and further miniaturization of integrated circuits, have made it possible to be integrated into a wide variety of devices. Due to the recent advancement of information technology and the growing popularity of the Internet, a vast amount of information is now available in digital form. Such availability of information or data has provided many opportunities.

As the technology field grows exponentially each year and ever-growing amounts of data are stored, retrieved, and accessed on computing systems, the need to deliver accurate and applicable data becomes increasingly paramount. Consequently, the need for advancement in a computing system capable of recommending relevant and accurate information is of great precedence.

SUMMARY OF THE INVENTION

Various embodiments for recommending predictive modeling methods and features by a processor, are provided. In one embodiment, by way of example only, a method for recommending domain-oriented predictive model methods and features by a processor is provided. One or more extracted methods and features of one or more predictive models are received according to selected criteria from both a structured database and from one or more data sources from a remote database. One or more extracted predictive model methods and features may be recommended according to the selected criteria.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a diagram depicting an exemplary domain-objective input query in accordance with aspects of the present invention;

FIG. 7A-7B are diagrams depicting exemplary domain-objective input queries and output results in accordance with aspects of the present invention;

FIG. 9 is a diagram depicting an exemplary method extraction in accordance with aspects of the present invention;

FIG. 10 is a diagram depicting an exemplary feature extraction in accordance with aspects of the present invention;

FIG. 12 is a diagram depicting an exemplary user review feedback in accordance with aspects of the present invention;

DETAILED DESCRIPTION OF THE DRAWINGS

Figure 1:
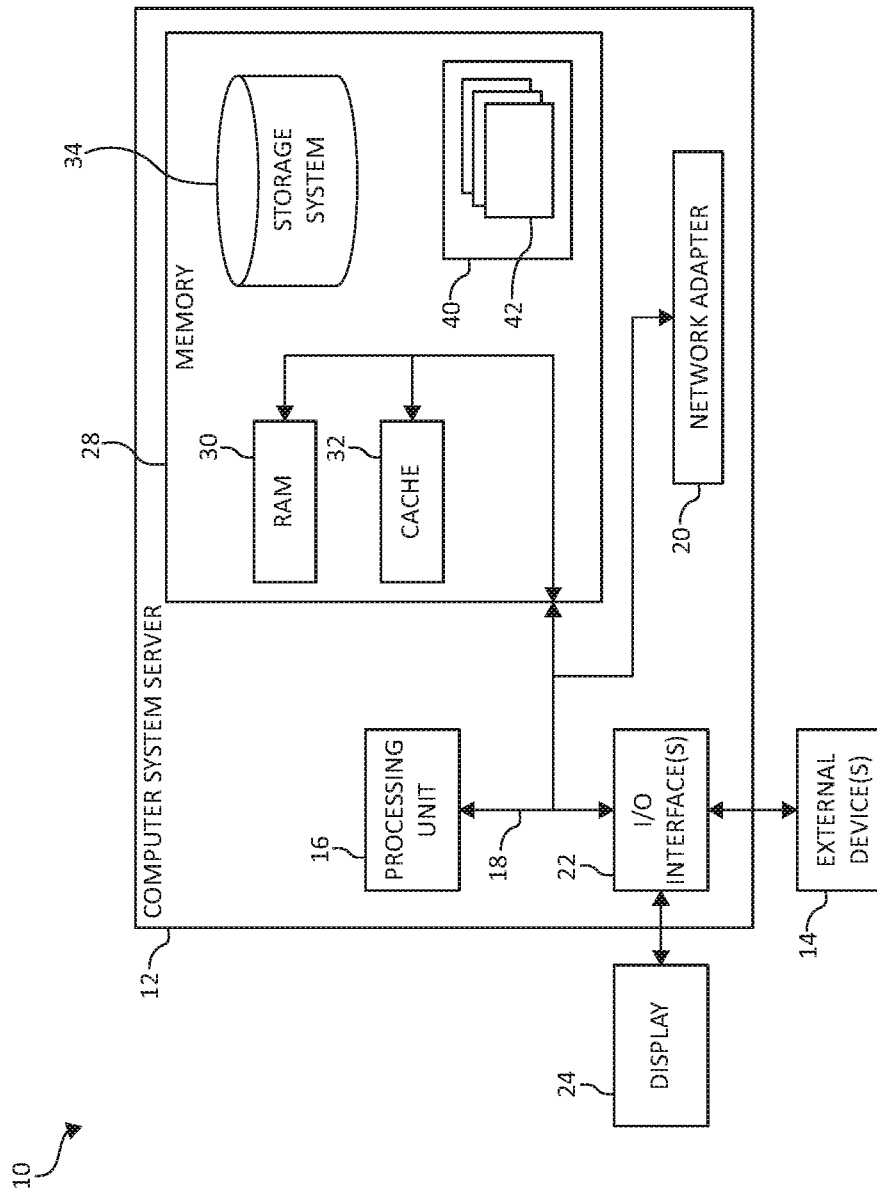
FIG. 1 is a block diagram depicting an exemplary computing node according to an embodiment of the present invention.

The advancement of computing storage and computational power provide the ability to collect large amounts of data, particularly for various types of scientific studies. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within the scientific field environment. However, a need exists for the extraction of information while automatically analyzing the extracted information. More specifically, the need exists for the extraction of information with the ability to analyze and/or model data, determine one or more methods, and/or extract methods and features from a model used as determined from analyzing the extracted information.

Accordingly, the present invention provides a system that cognitively recommends to one or more domain experts one or more modeling methods while simultaneously suggesting and/or providing one or more features or parameters relevant or associated with the recommended modeling methods.

In one aspect, one or more extracted methods and features of one or more predictive models are received according to selected criteria from both a structured database and from one or more data sources from a remote database. One or more extracted predictive model methods and features may be recommended according to the selected criteria.

In one aspect, the mechanisms of the illustrated embodiments provide for the cognitive recommendations of analytical or predictive modeling methods and features given a domain of interest. A domain/area of interest, an objective of a model, and/or a description of available data may be determined, received from a user, and/or used as input information for recommending predictive modeling methods and features. The input data may be processed using natural language processing (NLP) operations. One or more relevant methods and features may be retrieved from a structured database (an offline search) while simultaneously extracting additional methods from retrieved scientific papers/articles from one or more remote databases (e.g., an online search, internet search of web pages/web services). A list of recommendations of the methods and features may be provided based on selection criteria of the input data. A ranked list of recommended predictive modeling methods and features may also be provided to a graphical user interface (GUI) of a computing device, with corresponding computational complexity and suggested application. A knowledge domain or ontology of the extracted methods and features may be collected and stored in the structured database. A ranking score may be assigned to each of the recommended methods based on impact factors of journals/conferences, time of publication, number of hits, and number of citations.

The term ontology is also a term intended to have its ordinary meaning. In one aspect, the term ontology in its broadest sense may include anything that can modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, analytics methods (such as neural network, K-Nearest Neighbor "KNN", linear regression, etc.), general or domain-specific parameters (such as time of the day, day of the week, atmospheric parameters, traffic density, etc.), scientific information, geography, websites and databases dedicated to selected regions, or a combination thereof. The ontology can be continuously updated with the information synchronized with the sources, adding information from the sources to the ontology as models, attributes of models, or associations between models within the ontology.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) High degree of relevant recollection from data points (images, text, voice) (memorization and recall); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, web sites, online journal, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
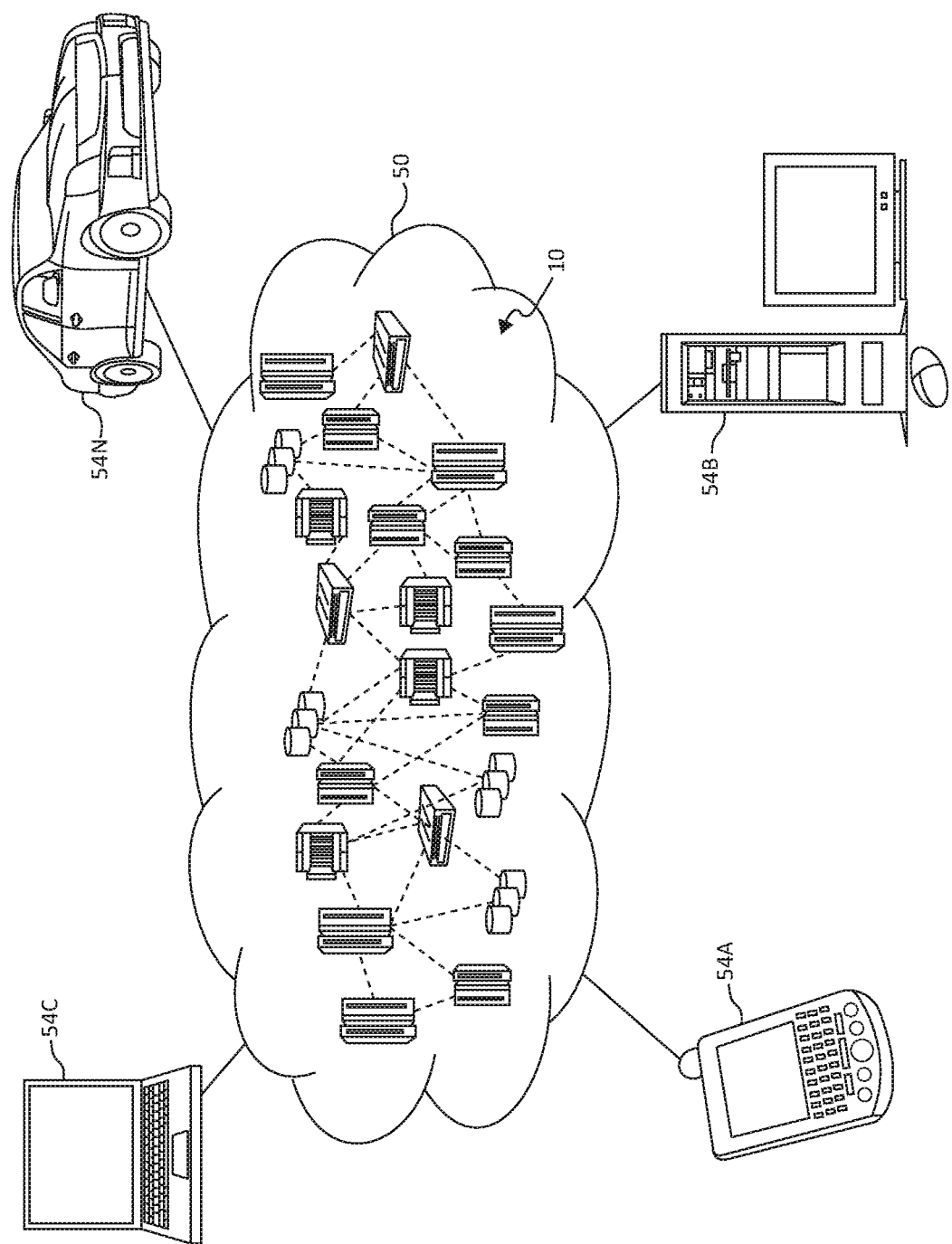
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
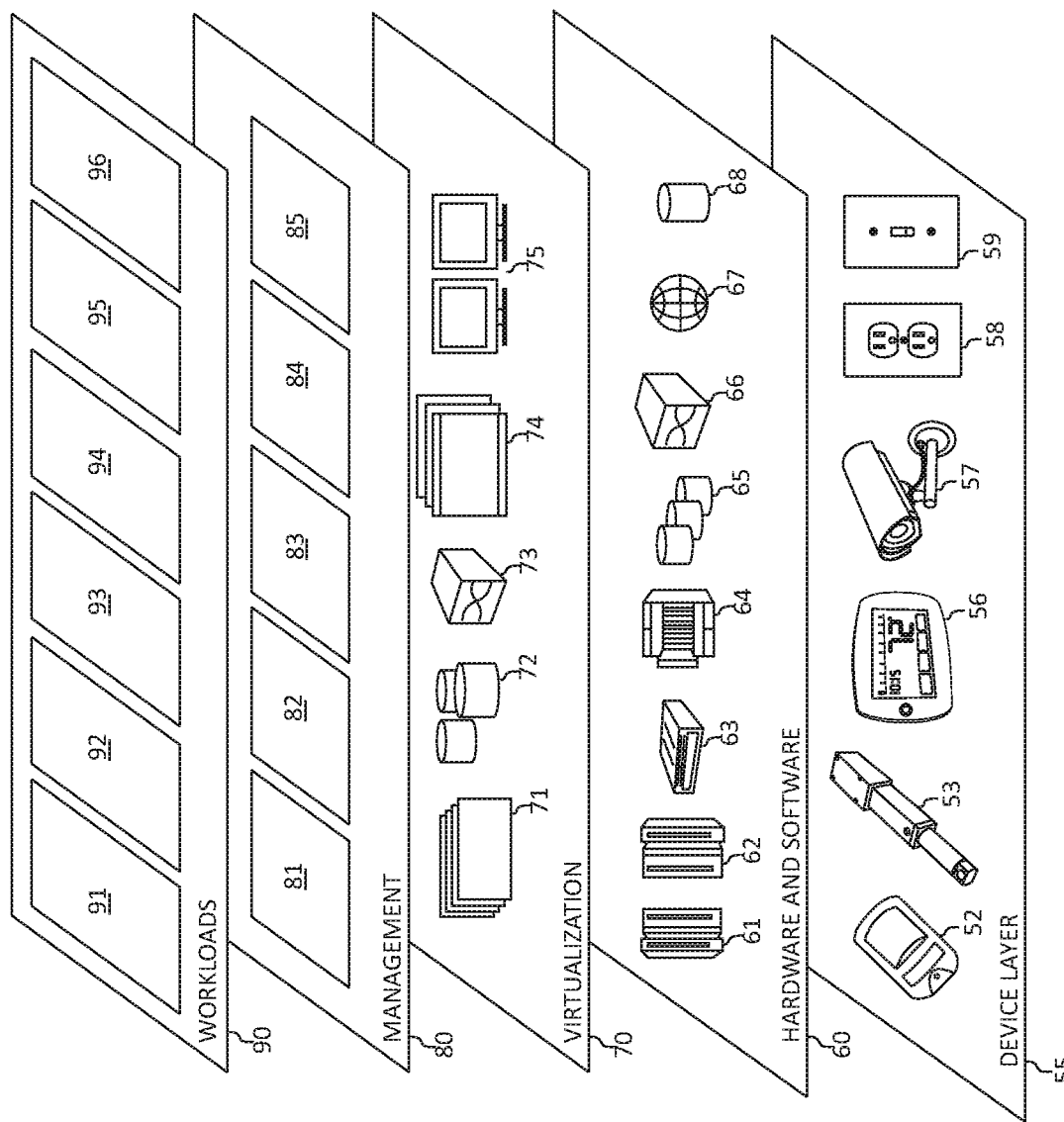
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various predictive modeling methods and features recommendation workloads and functions 96. In addition, predictive modeling methods and features recommendation workloads and functions 96 may include such operations as data analysis (including data collection and processing from various environmental sensors), and predictive data analytics functions. One of ordinary skill in the art will appreciate that the predictive modeling methods and features recommendation workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
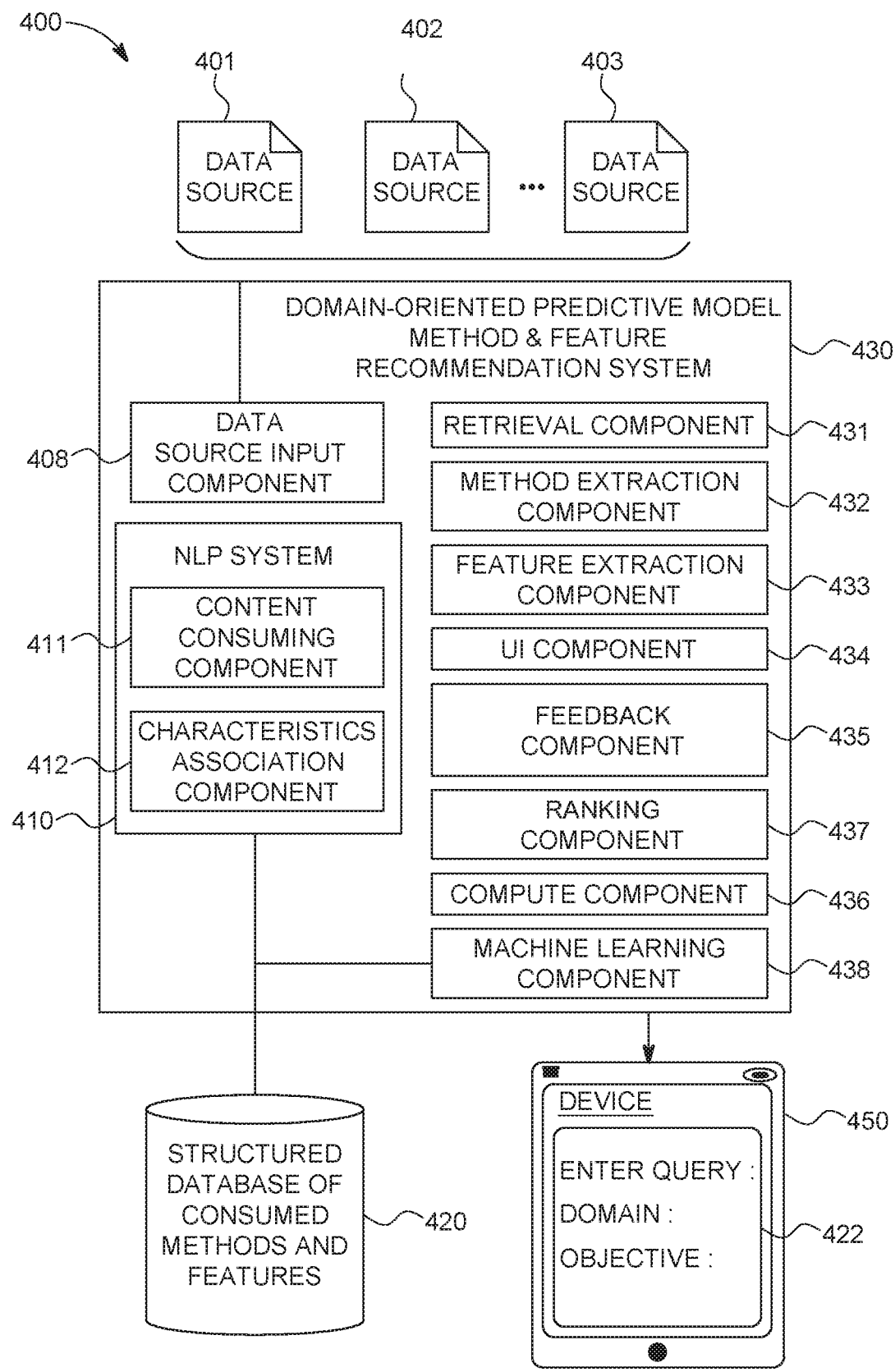
FIG. 4 is a diagram depicting an exemplary functional relationship between various aspects of the present invention.

Turning now to FIG. 4, a block diagram of exemplary functionality 400 relating to recommending predictive modeling methods and features is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for recommending predictive modeling methods and features in accordance with the present invention, such as those described in FIGS. 1-3. Many of the functional blocks 400 may execute as background processes on various components, either in distributed computing components, or on the user device, or elsewhere.

Multiple data sources 401-403 may be provided as a corpus or group of data sources defined and/or requested by a user. The data sources 401-403 may include, but are not limited to, data sources relating to one or more documents, materials related to a conference, books, scientific papers, online journals, journals, articles, newspapers, and/or other various documents or data sources capable of being published or displayed. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text based documents, other data sources such as audio, video or image sources may also be used wherein the documents may be pre-analyzed to extract their content for natural language processing, such as converting from audio to text and/or image analysis.

The group of data sources 401-403 are consumed for a method and feature recommendation system such as, for example, domain-oriented predictive model method and feature recommendation system 430 using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-403 may be analyzed by an NLP system 410 to data mine the relevant information from the content of the data sources 401-403 (e.g., methods and features extracted from mined scientific papers or documents) in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-403 as selected by using a data source input component 408, including, for example, word docs, scientific papers, journals, books, online journals, wikis, web pages, power points, Internet word docs, knowledge centers, anything that the NLP system 410 knows how to understand. This may extend to non-text based documents, by providing pre-analyzing of the content such as audio to text processing.

The NLP system 410 may include a content consuming component 411 for inputting the data sources 401-403 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-403 by determining common concepts, methods, features, similar characteristics, and/or an underlying common topic. More specifically, the NLP system 410 may data mine the data sources 401-403 to identify and extract one or more methods and associated features via the characteristics association component 412.

Cognition is the mental process of knowing, including aspects such as awareness, perception, reasoning and judgment. An AI system uses artificial reasoning to interpret the data sources 401-403 and extract their topics or concepts. The learned topics and concepts such as, for example, predictive modeling methods and features of a domain of interest, may not be specifically named or mentioned in the data sources 401-403 and is derived by the AI interpretation.

The learned content of the data sources consumed by the NLP system may be merged into a database 420 (e.g., a structured database of processed and extracted predictive modeling methods and associated features) or other data storage method of the consumed content with learned concepts, methods, and/or features of the data sources 401-403 providing association between the content referenced to the original data sources 401-403. The digital content of the original data sources 401-403 remains in the original data sources such as the wiki, web pages, etc., but the database 420 will have a logical understanding of how the original data sources 401-403 fit together using the power of the AI allowing for the concepts and therefore the associations or mappings between the data sources.

The merging of the data into one database 420 allows the domain-oriented predictive model method and feature recommendation system 430 to act like a search engine, but instead of key word searches, it will use an AI method of making cognitive associations between the data sources using the deduced concepts.

The domain-oriented predictive model method and feature recommendation system 430 may include a user interface component 434 (e.g., an interactive graphical user interface "GUI") providing user interaction with the indexed content for mining and navigation and/or receiving one or more inputs/queries from a user. More specifically, the user interface component 434 may be in communication with a wireless communication device 450 (e.g., computer, laptop, smart phone, tablet, etc.) for also providing user interaction with the indexed content for mining and navigation and/or receiving one or more inputs/queries from a user for recommending one or more domain-oriented predictive model methods and features. The wireless communication device 450 may also include a GUI 422 for providing a domain-oriented query functionality such as, for example, interactive GUI functionality for enabling a user to enter a query in the GUI 422 relating to a domain of interest and an associated objective.

The domain-oriented predictive model method and feature recommendation system 430 may include a retrieval component 431 for retrieving the one or more data sources (and indexing) the content and characteristics of the content of the data sources (e.g., retrieving one or more articles or scientific papers that may include one or more predictive modeling methods and features). In one aspect, the retrieval component 431 may retrieve relevant methods and features from the structured database 420 (e.g., an offline search) and retrieve and extract additional methods and features from the data sources (e.g., an online search) such as, for example, retrieving from an internet search engine one or more scientific papers/articles.

The retrieval component 431 may provide a map index of topics or concepts (e.g., methods and/or features of one or more domains of interest) of the consumed data sources 401-403 as consumed by the NLP system mapping to the data sources 401-403. The map index may list sub-topics and hierarchies for navigation and includes links or references to the original data sources 401-403.

The domain-oriented predictive model method and feature recommendation system 430 may also include a method extraction component 432 (e.g., predictive model method component) and a feature extraction component 433 for extracting from the retrieved data sources relevant methods and features. The method extraction component 432 and the feature extraction component 433 may work in conjunction with the retrieval component 431. Once the NLP system 410 has carried out the linking of the data, the method extraction component 432 may mine the associated concepts or similar characteristics from the database 420 of the consumed content to provide the most relevant sets of data sources for a topic being searched and use the associated concepts or similar characteristics.

The domain-oriented predictive model method and feature recommendation system 430 may also include feedback component 435 for collecting and gathering feedback data from a user and/or user reviews associated with the extracted methods and features.

The domain-oriented predictive model method and feature recommendation system 430 may also include a ranking component 437 for determining and/or assigning a ranking score to each extracted method and feature. The ranking component 437 may work in conjunction with the method extraction component 432 and the feature extraction component 433 for compiling a list of recommendations of the methods and features based on a selection criteria and providing a ranked list of recommended predictive modeling methods and features, with corresponding computational complexity and suggested applications. The ranking component 437 may assign a score of the recommended predictive modeling method based on an impact factor of journals, time of publication, number of hits, and number of citations. In one aspect, the impact factor of a journal may be an average measure of citation frequency (e.g., the frequency or number of times a journal has been cited) over a specific period (e.g., a 2-year timeframe). For instance, a 2016 impact factor of a journal may be a ratio X/Y, where X is the number of times all publications in the journal in the years 2014 and 2015 were cited by the 2016 publication in the same journal, and Y may be a total number of publications in 2014 and 2015. The ranking operation may be any aggregation of the one or more selected features. A ranking scheme for journals may be based solely on the impact factor. Alternatively, the ranking operations may be based on the number of citations of a data source (e.g., article).

In one aspect, a compute component 436 may perform one or more various types of calculations or computations, which may assist the ranking component 437. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive Bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
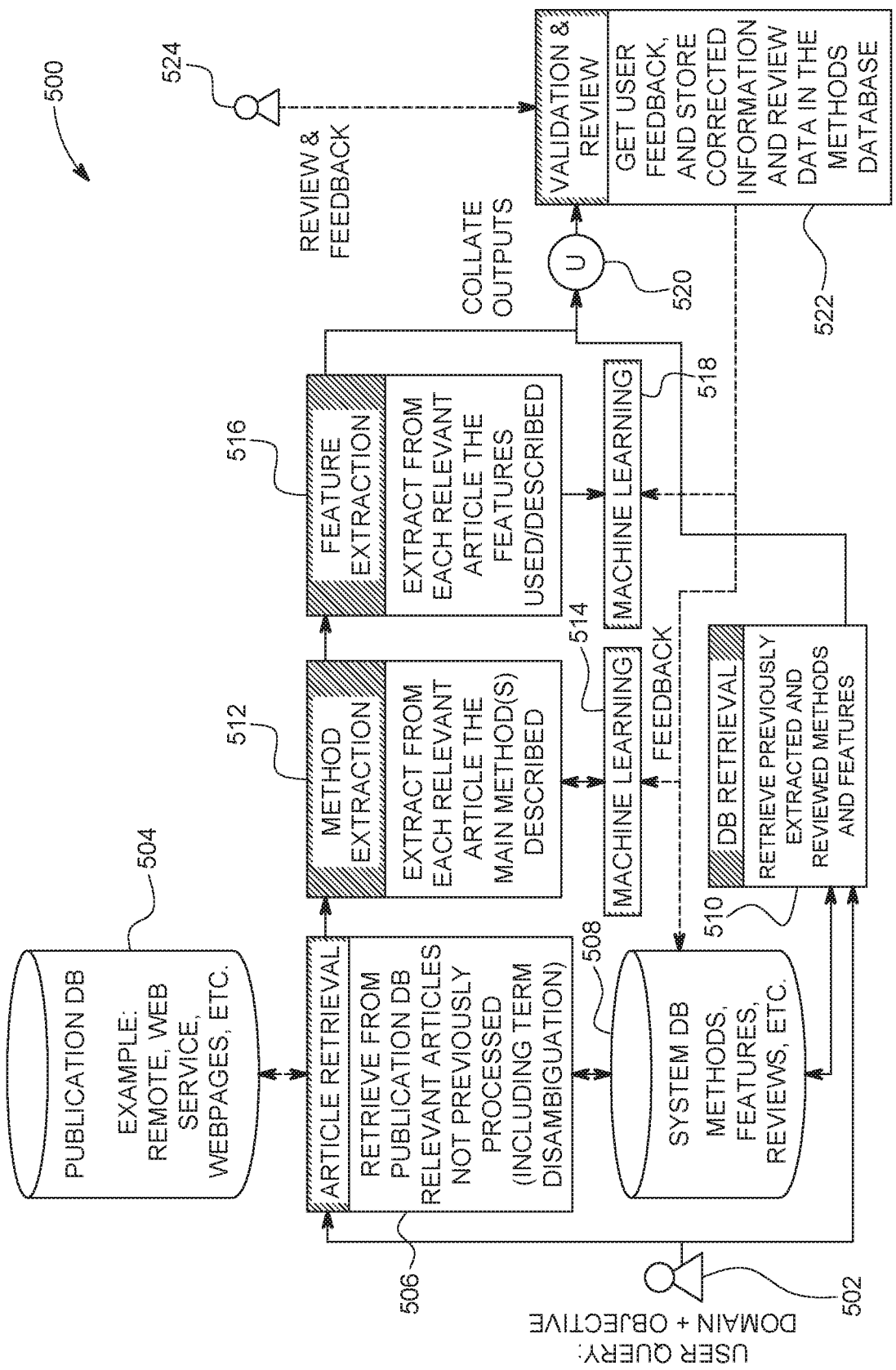
FIG. 5 is an additional block diagram depicting an exemplary functional relationship between various aspects of the present invention.

Consider the following example of various implementations of the aforementioned functionality as illustrated in FIG. 5. With the foregoing in mind and as a preliminary matter, the systems 500 of FIG. 5 respectively, may also be incorporated into various hardware and software components of a system for recommending predictive modeling methods and features in accordance with the present invention, such as those described in FIGS. 1-4. The systems 500 may execute as background processes on various components, either in distributed computing components, or on the user device, or elsewhere.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for recommending predictive modeling methods and features in accordance with the present invention. Many of the functional blocks 500 may execute as background processes on various components, either in distributed computing components, or on the user device, or elsewhere, and generally unaware to the user performing generalized tasks.

Starting with block 502, a user may provide or enter a query (such as via a GUI on a computing device) with the query containing a domain of interest and an objective. That is, a user may input a domain, an objective of one or more predictive models, and a description of available data. The input may be processed using one or more NLP techniques. At block 506, a data source retrieval operation (e.g., article retrieval operation) may be performed by retrieving one or more extracted methods and features of one or more predictive models according to selected criteria from both a structured database 508 and from one or more data sources from a remote database 504 (e.g., search engine query via the internet). The remote database 504 may be a publication database (DB) such as, for example, a remote web service of a service provider, and/or web pages. The structured database 508 may be a database of previously processed and extracted methods, features, and/or reviews (e.g., user reviews of the methods and/or features). At block 510, a retrieval operation may be performed to retrieve the previously extracted and reviewed methods and features. In one aspect, block 506 and 510 retrieval operations may be performed in sequence and/or in parallel. Upon retrieving one or more data sources from the remote database 504, a method extraction operation may be performed so as to extract from each retrieved and relevant (e.g., relevant to the domain and objective defined in the query) method(s) described in the data sources, as in block 512. Block 516 depicts extracting the features from each retrieved and relevant (e.g., relevant to the domain and objective defined in the query) feature used and/or described in the data sources (e.g., used or described in the method of a scientific paper).

From both descriptive blocks 512 and 516, one or more machine learning operations may be performed to learn the extracted methods and features, as in blocks 514 and 518.

As descriptive block 520 indicates, the output results of the extracted methods and features may be collated (and prepared for display if needed) to provide validation and review, as in block 522. The validation and review may include retrieving user feedback from a user 524, rating or correcting the output results according to the feedback, storing the rated and/or corrected information, and reviewing data in the structured database 508 (e.g., a methods, features, and reviews database).

With the foregoing functional components 500 in view, consider some of the various aspects of the illustrated embodiments. For example, consider the following for using a structured database for retrieving methods and features. The input may be a user query in the form of an application domain (e.g., transport, etc.), and an objective (e.g., clustering, forecast, etc.). The objective may be defined to retrieve from the system's database (the structured database aka "method DB") previously extracted and processed methods and features. This assumes that the previously processed methods and features have been stored and indexed in the database with references to the associated data source articles and user feedback information. The previously processed methods and features may be stored in one system-wide database for future queries. The system may be continuously updating this database as it is processing new user queries and receiving user feedback. Thus, the present invention builds an incremental database, that increases in efficiency, performance, processing, and/or querying and retrieval over time. Retrieval may be based on a keyword search according to the input. The output result may be a ranked list of methods and features, with references to the methods and features associated with the source articles. Methods and features may be ranked by relevance, user review, recentness, etc.

As an example, consider the following for using a remote database (e.g., a web page or web service provided by a service provider) for retrieving methods and features. The input may be a user query in the form of an application domain (e.g., transport, etc.), and an objective (e.g., clustering, forecast, etc.). The objective may be defined to retrieve from the remote database one or more data sources (e.g., articles, web pages, wikis, journals, etc.) that are relevant to the user query, and which may contain or possibly contain relevant methods and features (of a predictive model). Thus, the data sources may be indexed and accessible through a search engine. The data sources may be indexed and stored in the structured database. Retrieval may be based on a keyword search according to the input. The output result may be a list of data sources (e.g., articles) relevant to the user query. The output is then further processed by the method extraction and features extraction components with respect to extracting from the articles a ranked list of methods and their associated/recommended features, with references to the source articles. Methods and features may be ranked by relevance, user review, recentness, etc.

In one example, consider the following for detecting and extracting one or more methods and/or features. The input may be a data source (e.g., article) from one or more extracted data sources. The objective may be to extract from the input data source the described method (e.g., predictive model method) and associated features. The method may be to use a lexical and/or NLP and machine learning models. A thesaurus, lexicon, or ontology of data analytic methods may be used to construct from a knowledge domain of topics or concepts of the methods and features. The text documents may be annotated as training data for additional machine learning operations. The output result may be a ranked list of methods and features, with references to the methods and features to sourced passages of the data source that was mined.

In an additional example, consider a user query for electricity load forecasting according to the following selected criteria. The domain of interest may include energy and a sub-domain of electricity load forecasting. The objective may be a forecast for 1 day-ahead forecasting with a time frequency of every hour. The data description may include the electricity load data for a selected region including a timestamp, an hourly load, and/or weather (e.g., temperature, wind speed, dew points, humidity, etc.)

Using the query according to the selected criteria, one or more data sources may be retrieved from a structured database and/or a remote database (e.g., a cloud computing database). One or more methods may be extracted from the databases such as, for example, generalized additive model methods, artificial neural network ("ANN") methods, and/or random forest methods. From the extracted methods, one or more features used in the methods may also be extracted such as, for example, a calendar (e.g., time of day, time of week, time of year, and/or season), weather (e.g., temperature, lagged temperature, mean/minimum/maximum temperature, dew point, wind speed, humidity, etc.), and/or autoregressive models, process, or methods (e.g., daily mean/minimum/maximum and/or lagged load).

Turning now to FIG. 6 is a diagram depicting an exemplary domain-objective input query 600 in accordance with aspects of the present invention. The domain-objective input query 600 may be incorporated into various hardware and software components of a system for recommending predictive modeling methods and features in accordance with the present invention, such as those described in FIGS. 1-5. The domain-objective input query 600 may execute as background processes on various components, either in distributed computing components, or on the user device, or elsewhere.

For example, consider a user query for electricity load forecasting or a query for transportation according to the following selected criteria. As depicted, the input may be a query such as, for example, a query inputted into a GUI of a computing device, that may include a domain, objective, and/or a data description. The domain and objective may be selected from a predefined list (e.g., a drop-down box provided by the GUI). For example, the domain may be "energy" and "transport" (e.g., transportation) with respective sub-domains of "electricity load" and "taxi destination". The objective may be for 1-day ahead forecasting with a time frequency of 1 hour for the energy domain. The objective may be for next event forecasting with a time frequency of 1 minute for the transportation domain.

The data description may be an input text-box via the GUI. A user may input the data type and a brief description of what is included in the data. Alternatively, the actual data with column names can be the input. The data description may be automatically extracted. Accordingly, the recommending predictive modeling methods and features system may provide a recommendation search that may include a search of a local database (e.g., offline search) and a remote database (e.g., online search via cloud computing). A database of built-in solutions (e.g., the structured database) may provide various domains from prior knowledge (e.g., method and features for energy demand, train delay prediction). The remote database may retrieve and extract information from relevant data sources (e.g., scientific papers and technical reports) such as may be found from a remote search engine, web pages, and/or web services from a service provider. The output may be a list of recommended models with confidence scores (e.g., confidence scores based on relevance, year of publication and source reliance, e.g., journal impact factor), relevant features, suggested applications, and/or complexity of the method. The confidence score may be a linear combination of one or more criteria.

FIG. 7A-7B are diagrams depicting exemplary domain-objective input queries 700, 725 and output results in accordance with aspects of the present invention. The domain-objective input queries 700, 725 and output results may be incorporated into various hardware and software components of a system for recommending predictive modeling methods and features in accordance with the present invention, such as those described in FIGS. 1-6. The domain-objective input queries 700, 725 and output results may execute as background processes on various components, either in distributed computing components, or on the user device, or elsewhere.

As illustrated in diagram 700 of FIG. 7A, the input may be a query such as, for example, a query inputted into a GUI of a computing device, that may include a domain, objective, and/or a data description. The domain and objective may be "energy/smart meter". The objective may be for clustering based on user behavior. The data description may indicate 1 minute smart meter data with geolocations that may also include meter readings (Kilowatt (Kw)/hour (h), latitude (lat)/longitude (lon), and timestamps. The output of the extracted methods and features from one or more data sources, based on the selected criteria (input query data), may include methods of K-means methods, spectral clustering, and hierarchical clustering. The relevance may be indicated by a ranked score (indicated according to one or two "stars"). The data sources ("sources") of each method may be indicated such as, for example, John Doe 1 et al (2005), IEEE TPWS, John Doe 2 et al (2012), ICDM, and/or John Doe 3 et al (2010), REVSTAT. Also, a number of times the data source (e.g., article) has been accessed, search, retrieved, cited, and/or used may be indicated as a "hit" such as 96 for John Doe 1 et al (2005), IEEE TPWS, 24 hits for John Doe 2 et al (2012), ICDM, and 22 hits for John Doe 3 et al (2010), REVSTAT. The recommend features of the methods may include Wavelet decompositions, autoregressive terms (periodic), day type, time of year, and daily profiles and statistics (e.g., maximum, minimum, and/or standard).

As illustrated in diagram 725 of FIG. 7B, the input may be a query such as, for example, a query inputted into a GUI of a computing device, that may include a domain, objective, and/or a data description. The domain may be "transportation/city bikes". The objective may be for short-term forecasting of bike availability. The data description may indicate a number of available bikes at each bike station every 5 minutes along with the latitude (lat)/longitude (lon), and timestamps. The output of the extracted methods and features from one or more data sources, based on the selected criteria (input query data), may include methods of Bayesian Networks, generalized additive models ("GAM"), and/or autoregressive-moving average ("ARMA") models. The relevance may be indicated by a ranked score (indicated according to one, two, or three "stars"). The data sources ("sources") of each method may be indicated such as, for example, John Doe 1 et al (2009), IJCAI, John Doe 2 et al (2013), ITSC, and/or John Doe 3 et al (2010), PMC. Also, a number of times the data source (e.g., article) has been accessed, searched, retrieved, cited, and/or used may be indicated as a "hit" such as 265 hits for John Doe 1 et al (2009), IJCAI, 256 hits for John Doe 2 et al (2013), ITSC, and 150 hits for John Doe 3 et al (2010), PMC. The recommended features of the methods may include day type, time of day, time of year, bike availability at one or more adjacent bike stations, autoregressive terms, and/or weather.

Figure 8:
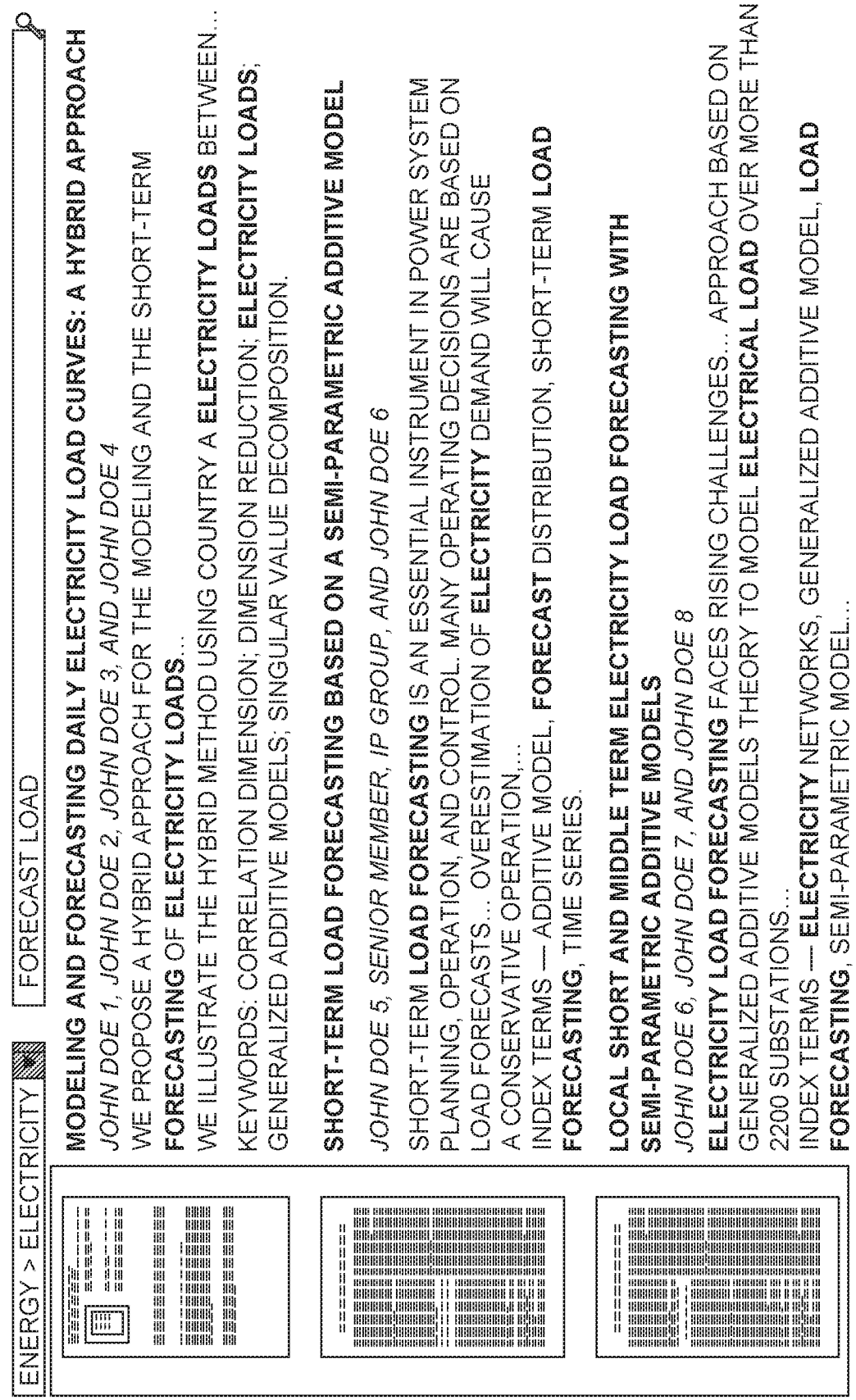
FIG. 8 is a diagram depicting an exemplary display of retrieved data sources in accordance with aspects of the present invention.

FIG. 8 is a diagram depicting an exemplary display 800 of retrieved data sources in accordance with aspects of the present invention. The display 800 of retrieved data sources may be incorporated into various hardware and software components of a system for recommending predictive modeling methods and features in accordance with the present invention, such as those described in FIGS. 1-7A-B. The display 800 of retrieved data sources may execute as background processes on various components, either in distributed computing components, or on the user device, or elsewhere.

The display 800 of the retrieved data sources may be articles that may be displayed in a GUI of a computing device. The retrieved articles may be listed according to title. In one aspect, the article may include the author and description of the articles. The GUI may include, with the retrieved data sources, the domain such as, energy or electricity (e.g., a subdomain of energy) and the objective such as, for example, forecast load.

Turning now to FIGS. 9 and 10 are diagrams depicting an exemplary method extraction 900 and feature extraction 1000. The method extraction 900 and feature extraction 1000 may be incorporated into various hardware and software components of a system for recommending predictive modeling methods and features in accordance with the present invention, such as those described in FIGS. 1-8. The method extraction 900 and feature extraction 1000 may execute as background processes on various components, either in distributed computing components, or on the user device, or elsewhere.

Having retrieved one or more data sources, as indicated in FIG. 9, the method extraction 900 may extract from the data sources (e.g., articles) one or more predictive model methods according to selected criteria (e.g., domain, objective, and/or data description). In one aspect, the retrieved data sources may be mined so as to detect the various models. As indicated in FIG. 9, the data source shows that the data mining operation detects the various models, such as semi-parametric additive model, additive model, regression model, modified bootstrap method, and bootstrap method. NLP operations may detect/recognize potential methods based on their proximity and/or relative position to certain keywords, as indicated in the dashed lines connecting various texts. A confidence score may be assigned to the one or more methods detected so as to indicate a level of confidence that the particular data source (e.g., article or scientific paper) indicates and/or discusses the methods. For example, the semi-parametric additive model may be assigned a confidence score of 80% confidence (0.8), the additive model may be assigned a confidence score of 60% confidence (0.6), the regression model may be assigned a confidence score of 50% confidence (0.5), the modified bootstrap method may be assigned a confidence score of 50% confidence (0.5), and the bootstrap method may be assigned a confidence score of 40% confidence (0.4).

As indicated in FIG. 10, the feature extraction 1000 may extract from the data sources (e.g., articles) one or more features associated with the predictive model methods according to selected criteria (e.g., domain, objective, and/or data description). In one aspect, the retrieved data sources may be mined so as to detect the various features. In one aspect, the features may be one or more variables used or discussed in relation to each method. As indicated in FIG. 10, the data source shows that the data mining operation detects the various features, such as calendar variables, lagged actual demand observations, historical and forecast temperature, previous demand observations, and/or temperature from one or more locations/sites. NLP operations may detect/recognize potential features based on their proximity and/or relative position to certain keywords, as indicated in the dashed lines connecting various texts. A confidence score may be assigned to the one or more methods detected so as to indicate a level of confidence that the particular data source (e.g., article or scientific paper) indicates and/or discusses the methods. For example, the calendar variables may be assigned a confidence score of 65% confidence (0.65), the lagged actual demand observations may be assigned a confidence score of 65% confidence (0.65), the historical and forecast temperature may be assigned a confidence score of 65% confidence (0.65), the previous demand observations may be assigned a confidence score of 57% confidence (0.57), and/or temperature from one or more locations/sites may be assigned a confidence score of 40% confidence (0.4).

Figure 11:
FIG. 11 is a diagram depicting an exemplary user validation and feedback in accordance with aspects of the present invention.

FIG. 11 is a diagram depicting an exemplary user validation and feedback 1100 in accordance with aspects of the present invention. The user validation and feedback 1100 may be incorporated into various hardware and software components of a system for recommending predictive modeling methods and features in accordance with the present invention, such as those described in FIGS. 1-10. The user validation and feedback 1100 may execute as background processes on various components, either in distributed computing components, or on the user device, or elsewhere.

In one aspect, user feedback may validate the extracted methods, extracted features, and the associated context. The user feedback may also include a review of the ranking and scoring of the extracted methods and features and/or the data sources. The user may edit one or more output results, the ranking, and/or the scoring of the extracted methods and features and/or the data sources. The user feedback may be stored in the structured database so as to be used to improve one or more subsequent queries/searches for similar predictive model methods and/or features of a domain of interest. The user feedback may also be fed back into a machine learning operation to improve one or more subsequent queries/searches for similar predictive model methods and/or features of a domain of interest.

For example, the user may correct information extracted from the data sources. In one aspect, the user may provide a "Yes" or "No" indication to each extracted method, extracted feature, and associated context. For example, a "No" indication may also include an option to provide corrected information. The corrected information may then be provided as feedback that may be indexed and stored in a structured database of processed and/or reviewed extracted methods and features. The user feedback may also be fed back into a machine learning operation to improve one or more subsequent queries/searches for similar predictive model methods and/or features of a domain of interest.

Figure 13:
FIG. 13 is a diagram depicting an additional exemplary user review feedback in accordance with aspects of the present invention.

FIGS. 12 and 13 are diagrams depicting an exemplary user review feedback 1200, 1300. The user review feedback 1200, 1300 may be incorporated into various hardware and software components of a system for recommending predictive modeling methods and features in accordance with the present invention, such as those described in FIGS. 1-11. The user review feedback 1200, 1300 may execute as background processes on various components, either in distributed computing components, or on the user device, or elsewhere.

In one aspect, the user review feedback 1200 may include reviews of the various data sources. The user review feedback may also include a review of the extracted methods, the extracted features and/or the data sources. For example, one or more data sources (e.g., articles or scientific papers) may be retrieved from a local, structured database and/or a remote database. The retrieved data sources may have previous user reviews (as shown in FIG. 12 according to a "star" ranking with dark shaded stars indicating a favorable review). For example, previous users who have tested one or more methods and features of the data sources may be linked and associated with the data source for review and display to a user. The user reviews may be indexed and stored in a structured database of processed and/or reviewed extracted methods and features. That is, the user feedback of those users who tested the one or more methods may be stored in the structured database so as to be used to improve one or more subsequent queries/searches for similar predictive model methods and/or features of a domain of interest.

As indicated in user review feedback 1300, the user feedback of those users that have tested the one or more methods may correct information extracted from the data sources. More specifically, the user who tested the various methods may rate each feature and provide one or more comments relating to the features. The user may review the features and rate the features (as shown in FIG. 13 according to a "star" ranking with dark shaded stars indicating a favorable review with 5 shaded stars being a highest or positive rating and 1 shaded star being a lowest or most negative user review). For example, the feature "calendar variables" may have a user review of "this is a very useful feature . . . " and have a four-star rating. The user reviews 1300 may then be provided as feedback that may be indexed and stored in a structured database of processed and/or reviewed extracted methods and features. The user feedback may be stored in the structured database so as to be used to improve one or more subsequent queries/searches for similar predictive model methods and/or features of a domain of interest.

Figure 14:
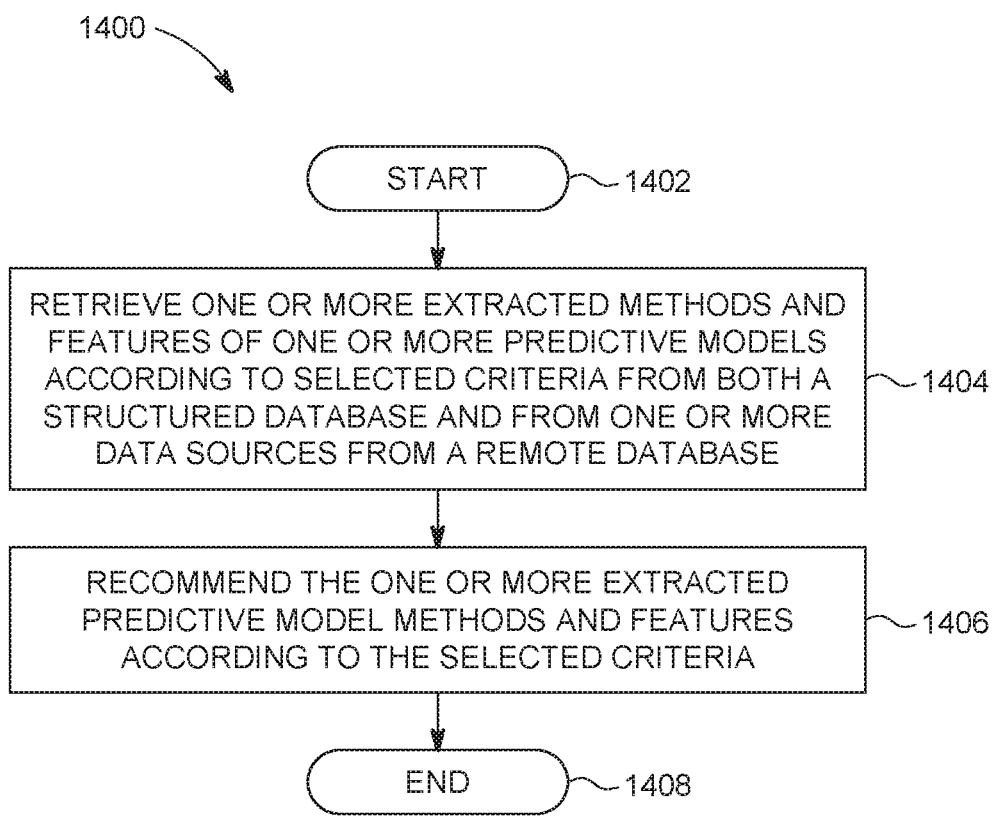
FIG. 14 is a flowchart diagram of an exemplary method for cognitive anomaly detection with fault diagnosis of a refrigeration condenser system by a processor, in which various aspects of the present invention may be realized.

FIG. 14 is an additional method 1400 for recommending predictive modeling methods and features by a processor, in which various aspects of the illustrated embodiments may be implemented. The functionality 1400 may be implemented as a method executed as instructions on a machine, where the instructions are included on at least one computer readable medium or one non-transitory machine-readable storage medium. The functionality 1400 may start in block 1402. One or more extracted methods and features of one or more predictive models are retrieved according to selected criteria from both a structured database and from one or more data sources from a remote database, as in block 1404. One or more extracted predictive model methods and features may be recommended according to the selected criteria, as in block 1406. The functionality 1400 may end in block 1408.

In one aspect, in conjunction with and/or as part of at least one block of FIG. 14, the operations of method 1400 may include each of the following. The operations of method 1400 may include receiving, as the selected criteria, input data that includes at least a domain and an objective of one or more predictive models; and processing the selected criteria using natural language processing (NLP). The operations of method 1400 may include extracting the one or more extracted methods and features of one or more predictive models from the one or more data sources. A score may be assigned to each of the one or more extracted predictive model methods according to a plurality of factors. A list of the one or more extracted predictive model methods ranked according to the score may be provided and displayed. The data sources may include at least articles, publications, journals, scientific papers, and/or books.

The operations of method 1400 may include collecting user feedback to validate accuracy of the recommended one or more extracted predictive model methods and features and collecting user feedback relating to the one or more extracted methods and features of one or more predictive models retrieved from the one or more data sources. Each method may be extracted from each data source. Also, each feature in the one or more extracted methods may be extracted. The features may be one or more variables used in each respective one of the one or more extracted methods.

The operations of method 1400 may include initializing a machine learning mechanism from feedback information to learn behavior of the one or more extracted predictive model methods retrieved from the one or more data sources, wherein the learned behavior is retained in the structured database.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for recommending predictive modeling methods and features by a processor, comprising:
receiving, as selected criteria, a query input by a user on a user interface (UI) of at least a domain and an objective of data desired by the user to be analyzed by one or more predictive models composed by clustering, artificial neural network (ANN), or machine learning algorithms; wherein the domain and objective comprises a brief description, input by the user during the query, of the data the user desires to be analyzed by the one or more predictive models;

according to the selected criteria, data mining information from one or more data sources from a remote database to identify and index content relevant to the selected criteria into a local, structured database; wherein the content is retained in the one or more data sources in the remote database notwithstanding the structured database maintains associations of concepts described by the content and a mapping of locations of the content from the one or more data sources;

incrementally amalgamating, in the structured database, the content relevant to the selected criteria from the one or more data sources from the remote database with previously processed methods and features known to be relevant to the selected criteria;

responsive to an analyzation of the content from the one or more data sources, the previously processed methods and features, and the selected criteria input by the user, retrieving one or more extracted methods and features of the one or more predictive models; wherein the one or more predictive models are not explicitly selected by the user notwithstanding the one or more predictive models are cognitively inferred as relevant to the domain and the objective according to the analyzation of the relevancy to the selected criteria; and recommending, via the UI, the one or more extracted predictive model methods and features to analyze the data according to the analyzation of the content from the one or more data sources, the previously processed methods and features, and the selected criteria input by the user.

2. The method of claim 1, further including processing the selected criteria using natural language processing (NLP).

3. The method of claim 1, further including extracting the one or more extracted methods and features of one or more predictive models from the one or more data sources.

4. The method of claim 1, further including:
assigning a score to each of the one or more extracted predictive model methods according to a plurality of factors; and
providing a list of the one or more extracted predictive model methods ranked according to the score, wherein the one or more data sources include at least articles, publications, journals, scientific papers, and books.

5. The method of claim 1, further including:
collecting user feedback to validate accuracy of the recommended one or more extracted predictive model methods and features; or
collecting user feedback relating to the one or more extracted methods and features of one or more predictive models retrieved from the one or more data sources.

6. The method of claim 1, further including identifying each feature in the one or more extracted methods, wherein the features are one or more variables used in each respective one of the one or more extracted methods.

7. The method of claim 1, further including initializing a machine learning mechanism from feedback information to learn behavior of the one or more extracted predictive model methods retrieved from the one or more data sources, wherein the learned behavior is retained in the structured database.

8. A system for recommending predictive modeling methods and features, comprising:
one or more computers with executable instructions that when executed cause the system to:

receive, as selected criteria, input a query input by a user on a user interface (UI) of at least a domain and an objective of data desired by the user to be analyzed by one or more predictive models composed by clustering, artificial neural network (ANN), or machine learning algorithms; wherein the domain and objective comprises a brief description, input by the user during the query, of the data the user desires to be analyzed by the one or more predictive models;

according to the selected criteria, data mine information from one or more data sources from a remote database to identify and index content relevant to the selected criteria into a local, structured database; wherein the content is retained in the one or more data sources in the remote database notwithstanding the structured database maintains associations of concepts described by the content and a mapping of locations of the content from the one or more data sources;

incrementally amalgamate, in the structured database, the content relevant to the selected criteria from the one or more data sources from the remote database with previously processed methods and features known to be relevant to the selected criteria;

responsive to an analyzation of the content from the one or more data sources, the previously processed methods and features, and the selected criteria input by the user, retrieve one or more extracted methods and features of the one or more predictive models; wherein the one or more predictive models are not explicitly selected by the user notwithstanding the one or more predictive models are cognitively inferred as relevant to the domain and the objective according to the analyzation of the relevancy to the selected criteria; and recommend, via the UI, the one or more extracted predictive model methods and features to analyze the data according to the analyzation of the content from the one or more data sources, the previously processed methods and features, and the selected criteria input by the user.

9. The system of claim 8, wherein the executable instructions further process the selected criteria using natural language processing (NLP).

10. The system of claim 8, wherein the executable instructions further extract the one or more extracted methods and features of one or more predictive models from the one or more data sources.

11. The system of claim 8, wherein the executable instructions further:
assign a score to each of the one or more extracted predictive model methods according to a plurality of factors; and
provide a list of the one or more extracted predictive model methods ranked according to the score, wherein the one or more data sources include at least articles, publications, journals, scientific papers, and books.

12. The system of claim 8, wherein the executable instructions further:
collect user feedback to validate accuracy of the recommended one or more extracted predictive model methods and features; or
collect user feedback relating to the one or more extracted methods and features of one or more predictive models retrieved from the one or more data sources.

13. The system of claim 8, wherein the executable instructions further identify each feature in the one or more extracted methods, wherein the features are one or more variables used in each respective one of the one or more extracted methods.

14. The system of claim 8, wherein the executable instructions further initialize a machine learning mechanism from feedback information to learn behavior of the one or more extracted predictive model methods retrieved from the one or more data sources, wherein the learned behavior is retained in the structured database.

15. A computer program product for recommending predictive modeling methods and features by a processor, the computer program product comprising a non-transitory computer-readable storage medium having computer-readable program code portions stored therein, the computer-readable program code portions comprising:
   an executable portion that receives, as selected criteria, a query input by a user on a user interface (UI) of at least a domain and an objective of data desired by the user to be analyzed by one or more predictive models composed by clustering, artificial neural network (ANN), or machine learning algorithms; wherein the domain and objective comprises a brief description, input by the user during the query, of the data the user desires to be analyzed by the one or more predictive models;
   an executable portion that, according to the selected criteria, data mines information from one or more data sources from a remote database to identify and index content relevant to the selected criteria into a local, structured database; wherein the content is retained in the one or more data sources in the remote database notwithstanding the structured database maintains associations of concepts described by the content and a mapping of locations of the content from the one or more data sources;
   an executable portion that incrementally amalgamates, in the structured database, the content relevant to the selected criteria from the one or more data sources from the remote database with previously processed methods and features known to be relevant to the selected criteria;
   an executable portion that, responsive to an analyzation of the content from the one or more data sources, the previously processed methods and features, and the selected criteria input by the user, retrieves one or more extracted methods and features of the one or more predictive models; wherein the one or more predictive models are not explicitly selected by the user notwithstanding the one or more predictive models are cognitively inferred as relevant to the domain and the objective according to the analyzation of the relevancy to the selected criteria; and
   an executable portion that recommends, via the UI, the one or more extracted predictive model methods and features to analyze the data according to the analyzation of the content from the one or more data sources, the previously processed methods and features, and the selected criteria input by the user.

16. The computer program product of claim 15, further including an executable portion that processes the selected criteria using natural language processing (NLP).

17. The computer program product of claim 15, further including an executable portion that extracts the one or more extracted methods and features of one or more predictive models from the one or more data sources.

18. The computer program product of claim 15, further including an executable portion that:
   assigns a score to each of the one or more extracted predictive model methods according to a plurality of factors; and
   provides a list of the one or more extracted predictive model methods ranked according to the score, wherein the one or more data sources include at least articles, publications, journals, scientific papers, and books.

19. The computer program product of claim 15, further including an executable portion that:
   collects user feedback to validate accuracy of the recommended one or more extracted predictive model methods and features; or
   collects user feedback relating to the one or more extracted methods and features of one or more predictive models retrieved from the one or more data sources.

20. The computer program product of claim 15, further including an executable portion that identifies each feature in the one or more extracted methods, wherein the features are one or more variables used in each respective one of the one or more extracted methods.

21. The computer program product of claim 15, further including an executable portion that initializes a machine learning mechanism from feedback information to learn behavior of the one or more extracted predictive model methods retrieved from the one or more data sources, wherein the learned behavior is retained in the structured database.

* * * * *